United States Patent Office 2,959,962
Patented Nov. 15, 1960

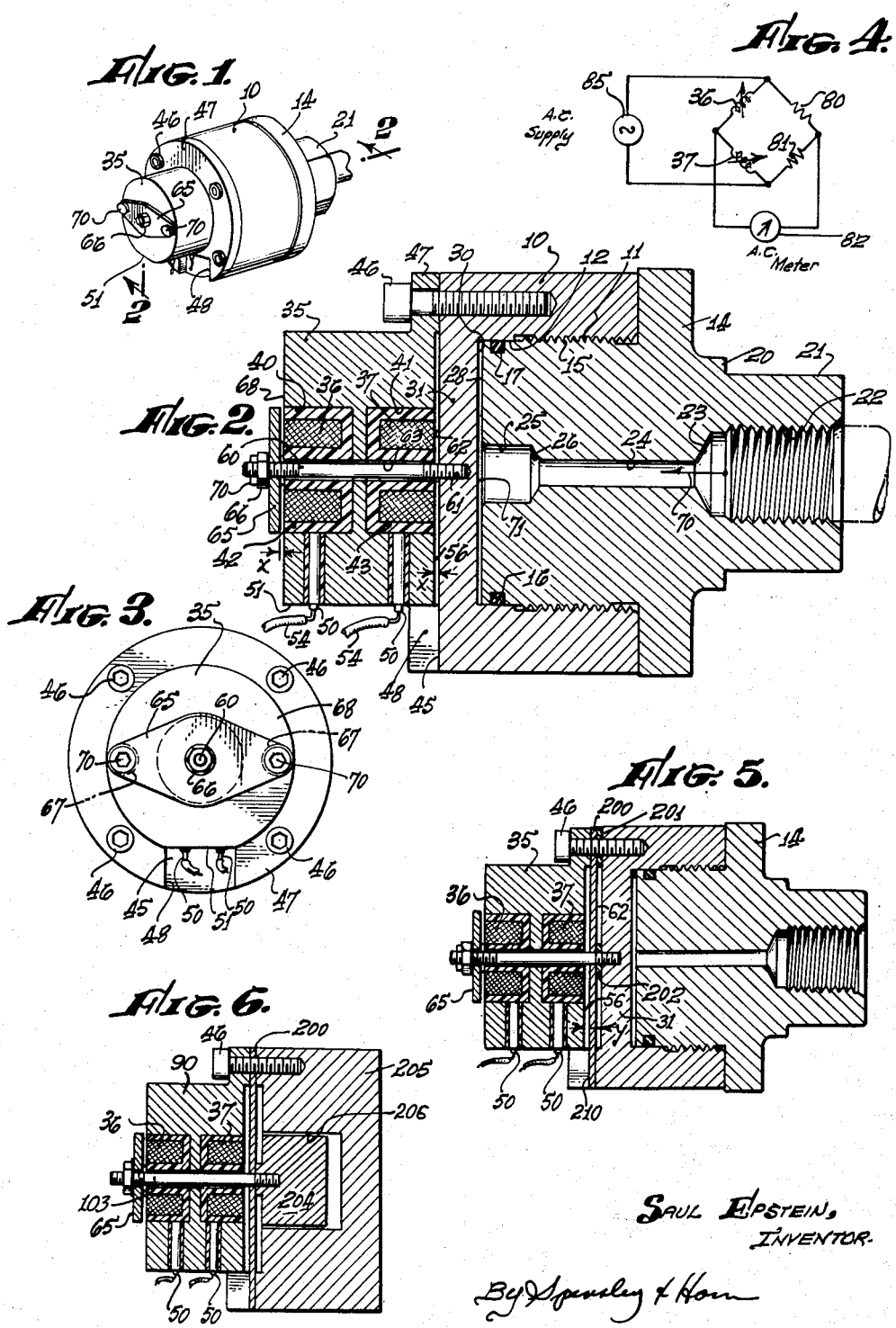

2,959,962

ELECTROMAGNETIC FLUID PRESSURE RESPONSIVE DEVICE

Saul Epstein, 5015 Varna Ave., Sherman Oaks, Calif.

Filed Oct. 2, 1957, Ser. No. 687,732

3 Claims. (Cl. 73—398)

This invention relates to a device for producing an electrical signal in response to varying physical parameters and more particularly to a device for producing an accurate electrical indication of a mechanically induced force.

Many types of electromagnetic motion or force responsive devices or transducers have been known for producing and transmitting electrical signals indicative of such motion or force. Such devices typically involve the use of a movable core relative to a stationary coil or a series of coils, or their associated cores. In these prior art transducers, the coils are typically so arranged as to be physically non-symmetrical, thereby rendering the transducer subject to changes in temperature of the ambient.

Other of the prior art devices have the flux path passing directly through the case housing the pressure sensing element. This is a design limitation as it may be undesirable or technically impossible to find a material which is magnetic and yet meets the design requirements for the particular case. Further, if the flux is primarily confined to a core, not forming part of the case it may be of a laminated construction resulting in a reduction in eddy current losses and producing a more nearly linear response.

Still other of the prior art devices have the force responsive medium such as gas or liquid under pressure coming into direct contact with the varying magnetic flux conducting member and the coil or coils associated therewith, which is undesirable.

It is therefore an object of the present invention to provide an improved device for translating various physical parameters into electrical signals.

Another object of this invention is to provide an improved transducer for translating a variable force into an appropriate electrical signal.

A further object of this invention is to provide an improved pressure responsive device which is compact, and produces a linear electrical signal in response to the pressure.

Yet another object of this invention is to provide an electrical pressure transducer for translating a liquid pressure into an electrical signal wherein the pressure sensing portion of the device is isolated from the electromagnetic portion.

A still further object of this invention is to provide a pressure sensing device having a novel arrangement of the pressure sensing elements and the magnetic circuits which provides an electrical signal control.

A further object of this invention is to provide a pressure sensitive variable reluctance device of a novel construction having symmetrically disposed variable magnetic reluctance sensing elements.

Yet a further object of this invention is to provide a device of the type described which may easily be disassembled for cleaning and yet be compact and rugged with a low response to mechanical shock.

In accordance with the presently preferred embodiment of this invention there is provided a pressure chamber, or force receiving pickup member, which is physically coupled or integral with a diaphragm made of magnetic material. Two identical coils, or windings, wired in series bucking relationship are symmetrically physically separated while being concentrically aligned. The magnetic member is disposed adjacent one winding and is mechanically coupled to a second magnetic member with the latter member being similarly disposed adjacent the other winding. Upon application of a force to the first magnetic member or diaphragm, its displacement from the core associated with the first winding is altered by a certain distance. Due to the mechanical coupling between the two magnetic members, the second is also displaced the same distance but in the opposite direction from its associated winding. The displacement of each of the magnetic members relative to their associated cores will cause a change in their respective inductances. The coils are each wired to a bridge circuit by means of which the difference in the inductances of the two windings may be accurately measured.

The novel features which are believed to be characteristic of the present invention, both as to its organization and mode of operation, together with further objects and advantages thereof will be better understood from te following description considered in connection with the accompanying drawing. It is to be expressly understood, however, that the drawing is for the purpose of illustration and example only, and is not intended as a definition of the limits of the invention.

In the drawing:

Figure 1 is a perspective view of a pressure transducer device in accordance with the presently preferred embodiment of the invention;

Figure 2 is an enlarged view in cross-section of the device of Figure 1 taken along line 2—2;

Figure 3 is an end view of the device of Figure 1;

Figure 4 is a view of a bridge circuit which may be used in connection with the present invention;

Figure 5 is an alternative embodiment of the device of Figure 2; and

Figure 6 is another alternative embodiment of the device of the present invention.

Referring now to the drawings, wherein like reference characters designate like or corresponding parts throughout the various views, there is shown in Figures 1, 2 and 3 the presently preferred embodiment of the transducer of the present invention as an assembled unit without the associated bridge circuitry.

In the embodiment of Figures 1, 2 and 3, it will be assumed for the purposes of clarity and description only, that the device is employed to measure the pressure of a liquid such as a hydraulic fluid. It will be understood, however, that this device may equally be applicable to measuring the pressure of any other fluid or gas.

In Figures 1 and 2, a main body portion 10 has an internal threaded portion 11 within recess 12. Pressure coupling 14 which has an externally threaded projection 15 is shown to be threadably fastened within recess 12. Projection 15 of coupling 14 may have a groove 16 therein near its left hand end to receive O-ring 17 which will assure a tight seal between coupling 14 and main body portion 10. Integral with coupling 14 is a circular raised shoulder portion 20 which supports hexagonal nut section 21. Within section 21 is a centrally located internally threaded hole 22 which is adapted to receive a hose or other coupling from a source of fluid pressure, not shown. Communicating with threaded hole 22 through tapered section 23 is a smaller hole 24 within coupling 14. Hole 24 terminates in larger hole or chamber 25, it communicating therewith through second tapered section 26. Thus, when coupling 14 is screwed within body 10 end surface 28 of coupling 14 is forced close to mating contact with surface 30 of body portion 10. Face 28 of coupling 14 does not quite contact surface 30, as the shank of coupling 14 is purposely made shorter in length than is the depth of the threaded hole within body 10 which receives it. This leaves an opening through hole 25 for fluid from coupling 14 to directly apply a force against diaphragm section 31 of body portion 10. The purpose of hole or recess 25 is to accept a boss (not shown) which may be provided on surface 30 of diaphragm 31. The boss is, however, not necessary when a diaphragm of substantial thickness, as shown, is used. Section 10 in this embodiment is made of a magnetic material such as magnetic stainless steel, for example, for reasons hereinafter to be explained. Coupling 14, on the other hand, may be of any high strength metal such as steel, not necessarily magnetic.

Pickoff unit 35 which may be made of brass or a similar metal, houses two coils 36 and 37 which are disposed within cores 40 and 41 within opposite faces of unit 35. The coil and core combinations thus constitute two separate electromagnets. The windings or coils are each potted in any compound known to the art which is shown at 42 and 43. Pickoff unit 35 is secured to surface 45 of body 10 by means of a plurality of threaded screws 46 through flange 47. A rectangular opening 48 is provided within flange 47 to permit the installation of terminals 50 at flat surface section 51 of unit 35. Terminals 50 permit coupling to be made between the windings 36 and 37 and wires 54 leading to the bridge circuit of Figure 4, for example.

A countersunk central recess 56 of a depth of $x$ as indicated in Figure 2 is provided in the right hand end of pickoff unit 35 to provide an air gap between coil 37 and diaphragm 31.

Stem members 60 having external threads at both ends thereof is threadably fastened within internally threaded hole 61 at the center of surface 62 of diaphragm 31. A central hole 63 whose inside diameter is sufficiently large enough to accommodate member 60 is provided through the length of pickoff element 35. It is preferable to have hole 63 of sufficient diameter to keep member 60 from bearing against the wall thereof. A second diaphragm or pickoff armature 65 is attached to the left hand, or outer end of member 60, it being securely fastened thereto by means of nut 66. The end of member 60 is threaded to receive nut 66 which may be tightened to hold diaphragm 65 in position. Armature 65 is displaced from coil 36 by spacers 67 which are placed between the armature 65 and surface 68 of pickoff unit 35. Screws 70 hold the ends of armature 65 against the surface 68 spaced by a distance $x$ which is equal to the thickness of the spacers 67. The armature 65 is bowed slightly outward at the center, as more fully discussed hereinafter, to exert a spring tension outward on rod 60 causing the rod 60 to be in tension in the zero position.

Having described the device of the present invention an exemplary application thereof in the measuring of the pressure of a liquid such as hydraulic fluid will now be given. The fluid under pressure enters hole 25 in the direction of arrow 70 through hole 24 which communicates with the fluid source through larger threaded hole 22. The fluid will exert a force upon the central portion 71 of diaphragm 31 about hole 25. This force will cause the diaphragm 31 to bow to the left thus decreasing the air gap between it and core 41. Thus, if $x$ were originally a distance of .005", for example, it may, upon the application of the force of the fluid, be reduced to .004", for example. The displacement of diaphragm 31 toward core 41 will urge member 60 toward the left a like distance, thus permitting the armature 65 to have its center moved away from core 40 by a like distance of .001". Thus, the magnetic reluctance of the magnetic circuit associated with coil 37 will decrease a predetermined amount while that of the magnetic circuit associated with coil 36 will increase by a like amount. This change in the magnetic reluctance of each of the magnetic circuits will effectively result in a change in the inductance of each of the coils. This interrelated change in the inductance of the two coils may be hereby explained with reference to Figure 4.

In Figure 4 there is shown a typical bridge circuit employing coils 36 and 37 as two arms of the bridge. The other two arms may be resistors 80 and 81. It is clear that if the inductances of coils 36 and 37 are equal and the resistances of arms 80 and 81 are equally matched, that the A.C. output meter 82 will have a zero reading when the bridge is energized by A.C. supply 85. In operation, therefore, when the inductance of the two arms vary their variations will be in opposite directions, inducing a reading on meter 82 which will be proportional to the change in inductance, assuming a fixed A.C. supply frequency. As the magnetic reluctance of each of the magnetic circuits will vary in accordance with the displacement of their respective diaphragms, the output of meter 82 will give a reading which is a direct function of the displacement. And, of course, the displacement of diaphragm 31 is directly proportional to the pressure of the fluid within chamber 25.

To insure a proper zero adjustment of the device of Figures 1, 2 and 3, the distance $x$ between diaphragm 31 and coil 37 must be exactly equal to that between diaphragm or armature 65 and coil 36. Recess 56 between the right hand side of pickoff unit 35 and surface 62 of armature 31 may be accurately machined to any desired amount, herein it may be .005", for example. In order to insure that the air gap between armature 65 and core 40 is the same, it has been found desirable to bow armature 65 away from core 40, i.e., to the left and then after assembled to tighten nut 66 until a reading of zero appears on meter 82. The design of the present invention inherently lends itself to this accurate zero adjustment assuring a more accurate reading of the pressure to be measured. The bowing of armature 65 imparts a spring-like resiliency thereto so that it will have a tendency to always exert a pressure against nut 66 on rod 60. Thus, while member 60 is not itself directly welded or otherwise permanently attached to armature 65, it is obvious that any force on member 60 directing it toward the left will have armature 65 follow the displacement of the member 60 by virtue of the resilient quality thereof hereinbefore referred to. Clearly, any movement of member 60 toward the right will cause the armature 65 to be depressed toward the right, i.e. toward the core associated with coil 36 as now nut 66 will force it in that direction.

As was previously mentioned it is desirable to have a laminated core for the coils which is clearly permissible in the present invention device as disclosed, unlike those of some prior art devices which have the magnetic flux passing through the case of the device which obviously cannot be of a laminated construction.

Further, since in the design of the present invention the two coils face each other and are symmetrically disposed, the device will be less subject to temperature change giving a more linear response. In fact, it has been found that devices constructed in accordance with this invention have a zero shift coefficient within 0.01% of full scale per °F. within an ambient temperature range from −65° F. to +250° F.

The pressure range of devices presently constructed in accordance with this invention is from 100 to 10,000 p.s.i.g., i.e., the lowest available range is from 0–100 p.s.i.g. and the highest is 0–10,000 p.s.i.g.

The extreme accuracy of devices presently constructed in accordance with this invention may be gleaned from the linearity which has been found to have a minimum departure from the best straight line within $+/-\frac{1}{2}\%$ of range. Further, the hysteresis error is within $\frac{1}{2}\%$ of the maximum pressure excursion.

It is apparent from the basic three piece design hereof with the fluid being entirely separated from the magnetic circuitry, that the device may be easily disassembled for cleaning while it is inherently rugged. It further lends itself to mass production having few moving parts and being essentially symmetrical.

A first alternative embodiment of the device of Figure 2 is shown in Figure 5. Therein all of the device elements are the same with the exception of a second diaphragm 200 whose surface 210 is displaced from surface 56 by a distance y. A plurality of wafer like spacers 201, 202 and 203, one for each screw 46, are interposed between unit 35 and first diaphragm 31. First diaphragm 31 and all of the body 10 need now no longer be constructed of magnetic material, but second diaphragm 200 must, of course, itself be magnetic. In the embodiment of Figure 6, pickoff unit 90 is substantially the same as that shown in Figure 5. It includes a second diaphragm 200 but eliminates the spacers 201, 202 and 203. A mass 204 is connected to the end of extending non-magnetic rod 103. Body unit 205 may then be shaped as shown defining an opening 206 to receive mass 204. The gap between mass 204 and opening 206 may be filled with a viscous fluid such as silicon oil for dampening purposes. Thus, the device will act as a motion transducer which will give an electrical indication by means of the bridge circuit of Figure 4 or the like being associated therewith.

Thus, there has been described a new and improved compact and rugged transducer for producing an electrical signal representative of a given physical force which has a substantially linear response under large variations in temperature.

What is claimed is:

1. A fluid pressure responsive device comprising: a body portion; a first pressure diaphragm of magnetic material defined by said body portion; a fluid pressure chamber at one side of said first diaphragm; a fluid path to said chamber, said diaphragm being longitudinally movable in response to fluid pressure in said chamber; a pickoff unit disposed at a second side opposite said one side of said first diaphragm, said pickoff unit including a longitudinally extending housing having a first face disposed a predetermined longitudinal distance from said first diaphragm to define a first air gap within which said first diaphragm is movable, said housing being formed of non-magnetic material; a first electromagnet disposed within said first face of said pickoff unit, said first electromagnet including a first winding; a second electromagnet longitudinally spaced from said first electromagnet and disposed within a second face of said longitudinally extending housing, said second electromagnet including a second winding, said second winding being in series bucking relationship with respect to said first winding, first and second magnetic cores surrounding said first and second windings respectively within said housing, said cores being longitudinally spaced apart; a second diaphragm of magnetic material disposed a predetermined longitudinal distance from said second face and said second electromagnet to define a second air gap through which said second diaphragm is movable; a non-magnetic member extending longitudinally through said pickoff unit and longitudinally movable with respect thereto, said member being affixed at a first end thereof to said first diaphragm and at the second end thereof to said second diaphragm, whereby longitudinal movement of said first diaphragm causes a like longitudinal movement of said second diaphragm to vary the effective inductances of said winding; and means for electrically sensing the difference in electrical inductance between said first and second windings when said windings have been excited by an A.C. source of potential.

2. A fluid pressure responsive device comprising: a body portion; a first pressure diaphragm of magnetic material defined by said body portion; a fluid pressure chamber at one side of said first diaphragm; a fluid path to said chamber, said diaphragm being longitudinally movable in response to fluid pressure in said chamber; a pickoff unit disposed at a second side opposite said one side of said first diaphragm, said pickoff unit including a longitudinally extending housing having a first face disposed a predetermined longitudinal distance from said first diaphragm to define a first air gap within which said first diaphragm is movable, said housing being formed of non-magnetic material; a first electromagnet disposed within said first face of said pickoff unit, said first electromagnet including a first winding; a second electromagnet longitudinally spaced from said first electromagnet and disposed within a second face of said longitudinally extending housing, said second electromagnet including a second winding, said second winding being in series bucking relationship with respect to said first winding, first and second magnetic cores of laminated material surrounding said first and second windings respectively within said housing, said cores being longitudinally spaced apart; a second diaphragm of magnetic material disposed a predetermined longitudinal distance from said second face and said second electromagnet to define a second air gap through which said second diaphragm is movable; a non-magnetic member extending longitudinally through said pickoff unit and longitudinally movable with respect thereto, said member being affixed at a first end thereof to said first diaphragm and at the second end thereof to said second diaphragm, whereby longitudinal movement of said first diaphragm causes a like longitudinal movement of said second diaphragm to vary the effective inductances of said windings; and means for electrically sensing the difference in electrical inductance between said first and second windings when said windings have been excited by an A.C. source of potential.

3. A fluid pressure responsive device comprising: a substantially cylindrical body portion, said body portion defining a longitudinal recess and a transverse first diaphragm of magnetic material, a pressure coupling mateable with said recess to define a pressure chamber between said coupling and one side of said first diaphragm, said coupling defining a fluid path to said chamber, said diaphragm being longitudinally movable in response to fluid pressure in said chamber; a pickoff unit disposed at a second side opposite said one side of said first diaphragm, said pickoff unit including a longitudinally extending housing having a first face disposed a predetermined longitudinal distance from said first diaphragm to define a first air gap within which said first diaphragm is movable, said housing being formed of non-magnetic material; a first electromagnet disposed within said first face of said pickoff unit, said first electromagnet including a first winding; a second electromagnet longitudinally spaced from said first electromagnet and disposed within a second face of said longitudinally extending housing, said second electromagnet including a second winding, said second winding being in series bucking relationship with respect to said first winding, first and second magnetic cores of laminated material surrounding said first and second windings respectively within said housing, said cores being longitudinally spaced apart; a second diaphragm of magnetic material disposed a predetermined longitudinal distance from said second face and said second electromagnet to define a second air gap through which said second diaphragm is movable; a non-magnetic member extending longitudinally through said pickoff unit and longitudinally movable with respect thereto, said member being affixed at a first end thereof to said first diaphragm and at the second end thereof to said second diaphragm, whereby longitudinal movement of said first diaphragm causes a like longitudinal movement of said second diaphragm to vary the effective inductances of said windings; and means for electrically sensing the difference in electrical inductance between said first and second windings when said windings have been excited by an A.C. source of potential.

References Cited in the file of this patent

UNITED STATES PATENTS

| | | |
|---|---|---|
| 2,510,073 | Clark | June 6, 1950 |
| 2,759,361 | Rich | Aug. 21, 1956 |

FOREIGN PATENTS

| | | |
|---|---|---|
| 969,884 | France | May 31, 1950 |
| 824,264 | Germany | Dec. 10, 1951 |